United States Patent [19]

Brandli et al.

[11] 4,084,217
[45] Apr. 11, 1978

[54] ALTERNATING-CURRENT FED POWER SUPPLY

[75] Inventors: Gerold Brandli, Aarau; Max Dick, Ennetbaden, both of Switzerland

[73] Assignee: BBC Brown, Boveri & Company, Limited, Baden, Switzerland

[21] Appl. No.: 788,931

[22] Filed: Apr. 19, 1977

[51] Int. Cl.² .............................................. H02M 7/06
[52] U.S. Cl. ...................................... 363/4; 315/205; 315/253; 363/67; 363/126
[58] Field of Search .............. 219/131 WR; 315/205, 315/253; 321/27 MS, 27 R, 47, 5; 363/67, 3, 4, 126

[56] References Cited

U.S. PATENT DOCUMENTS

| | | | |
|---|---|---|---|
| 2,209,948 | 8/1940 | Harmer | 321/5 |
| 2,261,699 | 11/1941 | Rampacher | 321/5 |
| 2,762,008 | 9/1954 | Gordon | 321/27 R |
| 2,763,771 | 9/1956 | Bichsel | 321/27 R X |
| 2,777,973 | 1/1957 | Steele et al. | 315/205 X |
| 2,962,649 | 11/1960 | Baum | 321/20 X |
| 3,258,673 | 6/1966 | Logan | 321/5 |

FOREIGN PATENT DOCUMENTS

| | | | |
|---|---|---|---|
| 2,110,226 | 9/1971 | Germany | 321/27 R |
| 2,309,989 | 9/1974 | Germany | 315/205 |

*Primary Examiner*—William M. Shoop
*Attorney, Agent, or Firm*—Oblon, Fisher, Spivak, McClelland & Maier

[57] ABSTRACT

An A.C. voltage fed power supply for D.C. gas-discharge lamps is disclosed having full-wave rectifying means connected on the A.C. side to at least two phase-adjusting networks for forming mutually phase-shifted partial currents and connected together on the D.C. side to superimpose the rectified, phase-shifted partial currents. Each phase-adjusting network is connected through the full-wave rectifying means to the same load impedance at the two D.C. voltage output terminals.

6 Claims, 4 Drawing Figures

ALTERNATING-CURRENT FED POWER SUPPLY

BACKGROUND OF THE INVENTION

1. Field of the Invention:

The present invention concerns an A.C.-fed power supply, particularly for D.C. gas-discharge lamps.

2. Description of the Prior Art:

A power supply for D.C. gas discharge lamps for producing UV-radiation is known (e.g. DT-OS No. 24 12 997 FIG. 5), which furnishes a pulsating D.C. affecting the efficiency and exhibits a complicated phase-shift control. Other power supplies are known which perhaps are simpler in design but include large inductance or capacitances for keeping the current ripple within acceptable limits. Such supplies thus present undesirable reactive impedances to the input power lines.

SUMMARY OF THE INVENTION

To eliminate the above mentioned drawbacks, the present invention is distinguished by having full-wave rectifying means to which at least two phase-adjusting networks are connected on the A.C. side to form mutually phase-shifted partial currents, and which are connected together on the D.C. side to superimpose the rectified, phase-shifted partial currents, and by having each phase-adjusting network connected around the full-wave rectifiers to the same load impedance across the D.C. supply output terminals.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF A PREFERRED EMBODIMENT

Figure 1:
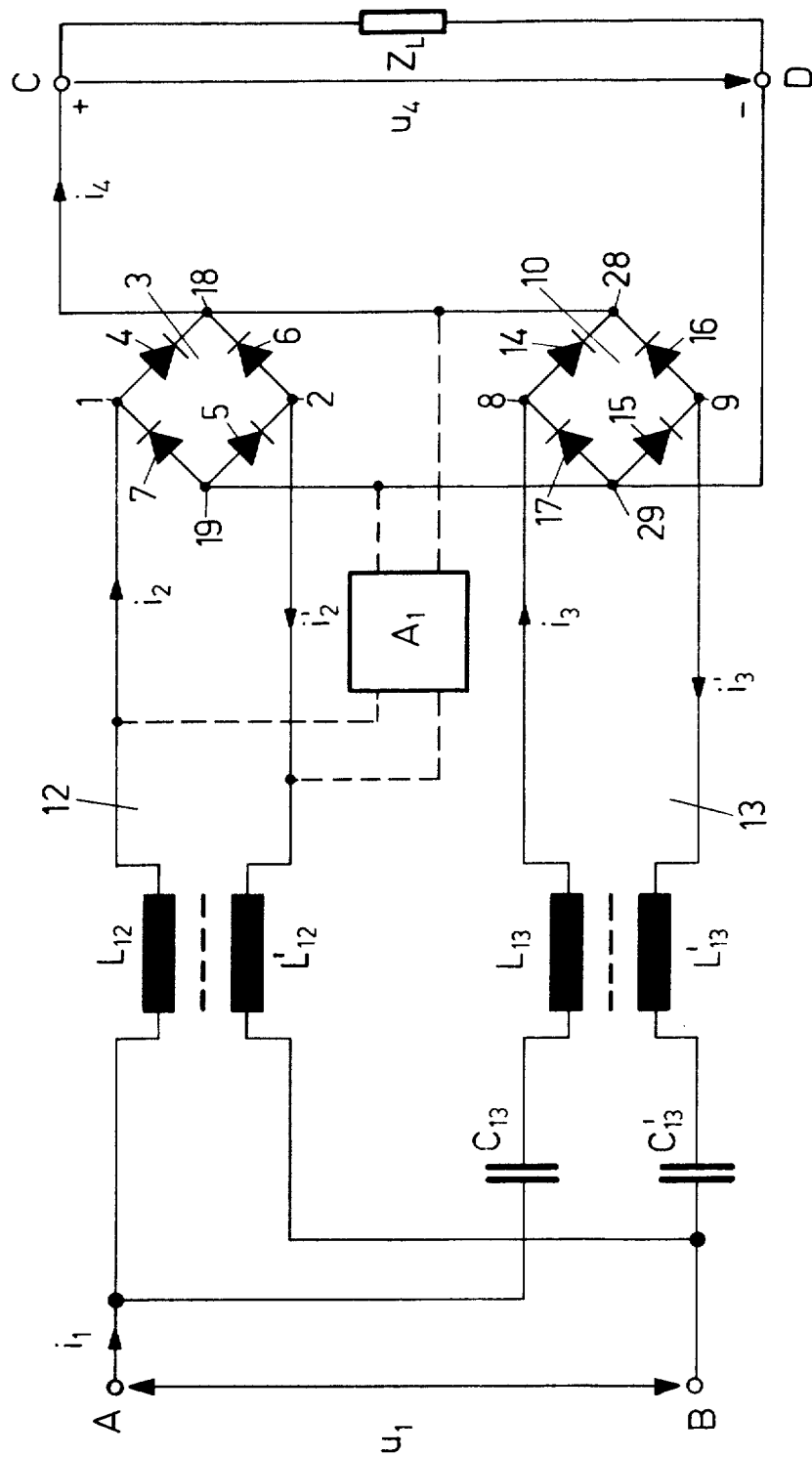
FIG. 1 shows the circuit diagram of a power supply with symmetrically arranged input impedances.

Referring now to the drawings, wherein like reference numerals designate identical or corresponding parts throughout the several views, and more particularly to FIG. 1 thereof, A and B denote the A.C. input terminals of the power supply, C and D the D.C. output terminals. The two A.C. input terminals A and B are each connected by way of an inductance $L_{12}$ and $L_{12}'$ to the A.C. terminals 1 and 2 of a Grätz rectifier circuit 3. The Grätz rectifier 3 is made up conventionally of four diodes 4, 5, 6, 7. In addition, the A.C. input terminals A and B are each connected to the A.C. terminals 8 and 9 of a second Grätz rectifier 10, comprising diodes 14, 15, 16, 17, through a series-connected capacitance $C_{13}$ and inductance $L_{13}$ or capacitance $C_{13}'$ and inductance $L_{13}'$. Two D.C. terminals 18 and 28 on the two rectifier circuits 3 and 10 are connected to one another and to a positive D.C. output terminal C. Analogously, two other D.C. terminals 19 and 29 of the two rectifiers 3 and 10 are connected together and to the second, i.e. the negative, D.C. output terminal D. To the two D.C. output terminals C, D, there is connected a gas-discharge lamp (not shown), preferably a high-current-low-pressure discharge lamp as in DT-OS No. 2,412,997.

Between the two A.C. terminals 1 and 2 and the two D.C. terminals 18 and 19 of the first rectifier circuit 3, there is connected a starting device $A_1$. The four inductances $L_{12}$, $L_{12}'$, $L_{13}$, $L_{13}'$ are preferably equal in value and each network is wound with equal numbers of turns pairwise on the same iron core.

Upon application of an A.C. voltage $u_1$ to the A.C. input terminals A, B, there flows through the purely inductive branches of network 12 with inductances $L_{12}$ and $L_{12}'$ an A.C. current $i_2$ which, after full-wave rectification, flows in the D.C. circuit as a pulsating current consisting of full-wave rectified half-waves. Simultaneously, there flows through the two branches of the network 13, each consisting of a capacitance $C_{13}$ or $C_{13}'$ in series with an inductance $L_{13}$ or $L_{13}'$, respectively, a second A.C. current $i_3$ which, again after full-wave rectification, flows in the D.C. circuit of the load as a pulsating half-wave current. It is essential that the reactances $X_{12}$ and $X_{13}$ of the networks 12 and 13 be so chosen that the effective values $I_2$, $I_3$ of the phase-shifted current components $i_2$ and $i_3$ flowing therein be equal to within $\pm$ 20%, where this holds also for the rectified values $|\bar{i}_2|$, $|\bar{i}_3|$ (Cf. e.g. DIN 40 110 (Feb. 1970) 17) of the partial currents $i_2$ and $i_3$, i.e.:

$$I_2 = I_3 \pm 20\%, \ |\bar{i}_2| = |\bar{i}_3| \pm 20\%.$$

This is approximately the case when the reactance values $X_{12}$ and $X_{13}$ of the two networks 12 and 13, calculated for the fundamental frequency of the input A.C. voltage $u_1$, are equal in magnitude and opposite in sign.

Figure 2A:
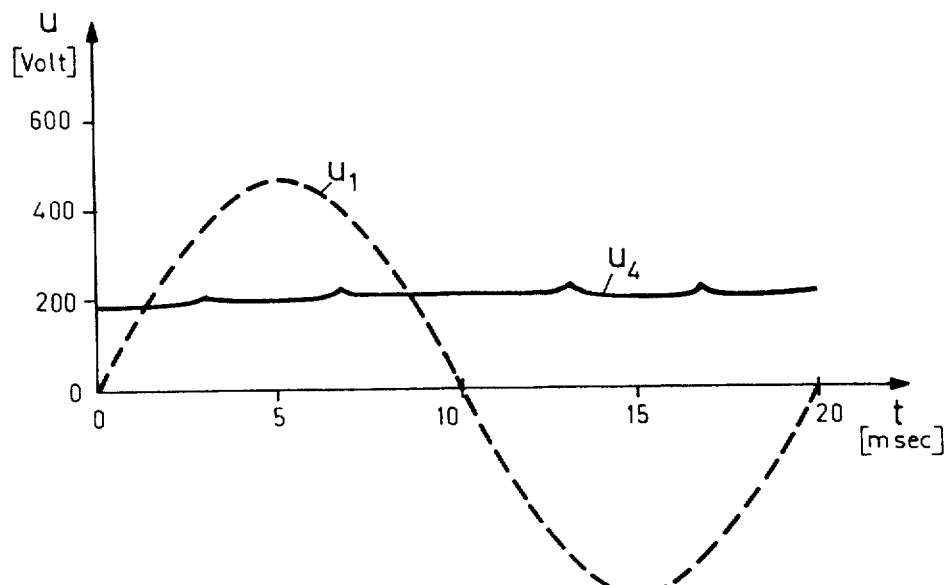
FIG. 2a shows the waveforms of the input A.C. voltage $u_1$ and the output D.C. voltage $u_4$.
Figure 2B:
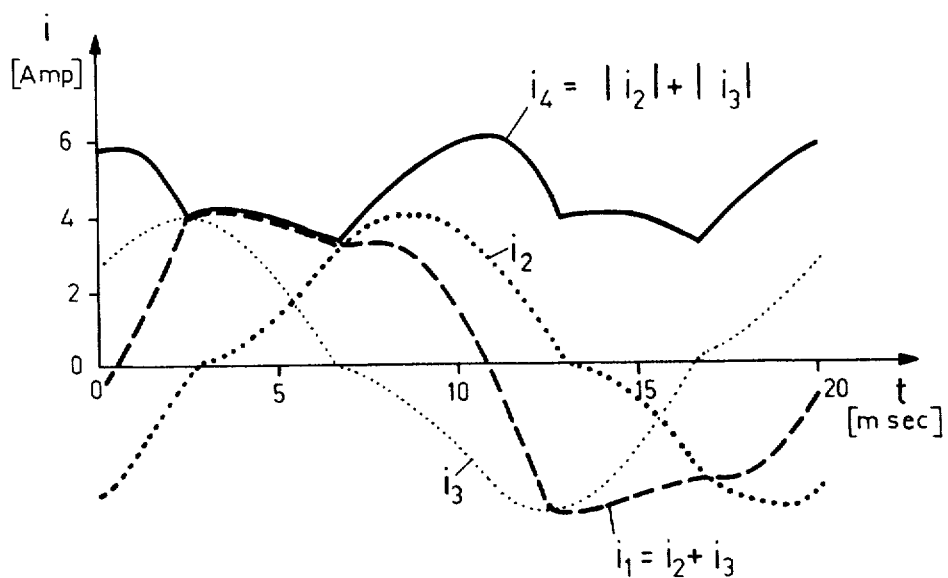
FIG. 2b shows the waveforms of the phase-shifted partial currents $i_2$, $i_3$, the input A.C. current $i_1$, and the D.C. current $i_4$ consisting of the summed rectified current components $|i_2|$ and $|i_3|$ flowing through the load impedance, all for a circuit as in FIG. 1 and a D.C. gas-discharge tube as load.

As can be seen in FIG. 2b, the phase-shifted current components $i_2$ and $i_3$ are very unsinusoidal and thus exhibit a considerable harmonic content. A calculation of the entire circuit is therefore difficult. Such a calculation, gives the following.

If the effective (or rectified) values $I_2$, $I_3$ (or $|\bar{i}_2|$, $|\bar{i}_3|$) of the phase-shifted partial currents $i_2$ and $i_3$ are equal to within $\pm$ 20%, then the input A.C. voltage $u_1$ and current $i_1$ are substantially in phase so that no or only insignificant quadrature components occur on the line.

In addition, it also suffices to make the effective values $I_1$ and $I_2$ equal within the stated limits in order to ensure that $i_2$ and $i_3$ are substantially symmetric with respect to $u_1$ in phase, and $u_1$ and $i_1$ are essentially in phase if care is simultaneously taken to make the one network capacitive and the other inductive.

Further, it can be shown that the current components $i_2$ and $i_3$ are phase-shifted by about 90° when the apparent power in network 12 or 13 is about half that in the load. The apparent power is defined as the product of the effective values of the current and the voltage. With $U_2$ = effective value of the voltage at network 12 and $U_3$ = effective value of the voltage at network 13, there then results: $S_2 = U_2 I_2 \approx S_3 = U_3 I_3 \approx 0.5 \ U_4 I_4$, where $U_4$ and $I_4$ are the effective values of the output D.C. voltage $u_4$ and D.C. current $i_4$.

If $Z_L$ denotes the nearly pure ohmic load impedance at the D.C. output terminals C and D, the approximately 90°-phase-shift of the current components $i_2$ and $i_3$ can also be expressed by the relation $$|Z_L| \approx 2|X_{12}| \approx 2|X_{13}|$$

where these impedance values can be approximately calculated, again, for the fundamental frequency of the input A.C. voltage $u_1$.

The 90°-phase-shift of the current components $i_2$ and $i_3$ does indeed result in an advantageously low current ripple, but greater independence of the D.C. current $i_4$ in the load $Z_L$ from fluctuations of the input A.C. voltage $u_1$ is favored by large reactance values $X_{12}$, $X_{13}$ of networks 12, 13, which cause a phase-shift of more than 90°. In practice, therefore, the reactance values $X_{12}$, $X_{13}$ are so adjusted that the apparent power in the networks 12, 13 is between 0.5 and 2 times that dissipated in the load $Z_L$, the latter being preferably 0.65 to 0.85 times the apparent power in $Z_L$, which corresponds to a phase angle between the current components $i_2$ and $i_3$ of about 120° or ± 60°.

If the two inductances $L_{12}$ and $L_{12}'$ of network 12 are slightly different, the two currents $i_2$ and $i_2'$ differ somewhat not only in their peak values but also in their phase relationship. The zero crossings of the two currents then no longer occur simultaneously and there are short time intervals when the currents $i_2$ and $i_2'$ are opposite in direction. The diodes 4 and 6 or 5 and 7 then conduct simultaneously, which amounts in either case to a short circuit between 1 and 2. These short circuits, it is true, do not impair the circuit's efficiency, while for the same power in the load $Z_L$, they increase the reactive loading of inductances $L_{12}$ and $L_{12}'$. Exactly the same holds correspondingly true for differences in the two branches $C_{13}L_{13}$ and $C_{13}' L_{13}'$ with respect to the current components $i_3$ and $i_3'$ flowing there. Care must therefore be taken to make $i_2 = i_2'$ and $i_3 = i_3'$. This is achieved by making the reactance values of the two inductances $L_{12}$, $L_{12}'$ or $L_{13}$, $L_{13}'$ in the same network 12 or 13, respectively, equal to each other, specifically by being wound with the same number of turns on the same iron core.

Furthermore, it is desirable for reasons of economy to have all the inductances $L_{12}$, $L_{12}'$, $L_{13}$ and $L_{13}'$ equal.

In practice, a circuit like that in FIG. 1 is conviently realized by first fixing the partial current $i_2$ through choice of the inductances $L_{12}$, $L_{12}'$, $L_{13}$, $L_{13}'$, and then, by the still free choice of the reactance values of the capacitances $C_{13}$, $C_{13}'$, making $I_2 = I_3$.

Figure 3:
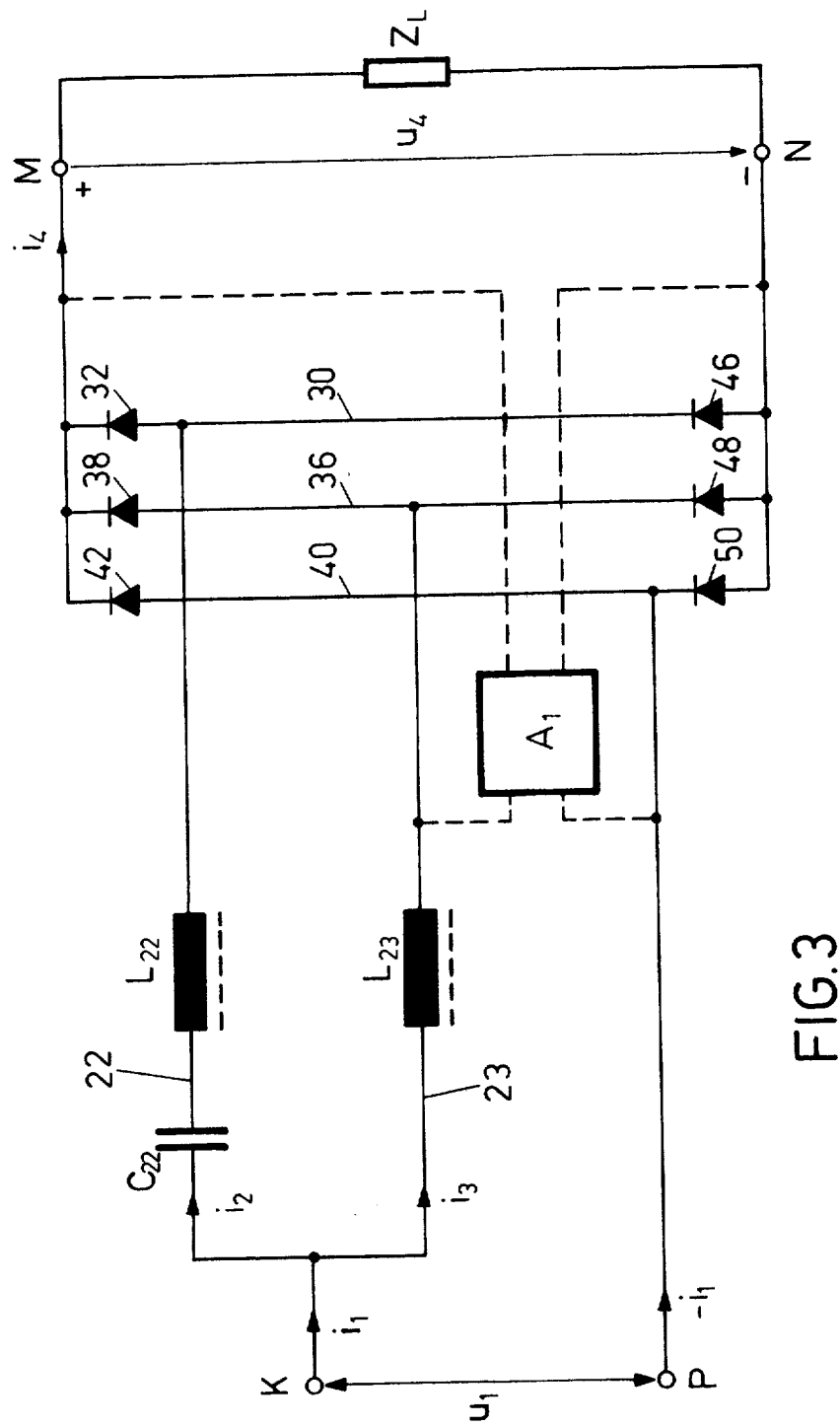
FIG. 3 shows a power supply with asymmetrically arranged input impedances.

FIG. 3 shows another circuit for the power supply. It is developed, basically, by suitably reducing the number of reactances in the two phase-adjusting networks of the circuit in FIG. 1. If, in the circuit of FIG. 1, the A.C. terminals 2,9 of the rectifier circuits 3,10 are directly connected to the A.C. input terminal B, the diodes 5,6 are placed in parallel with diodes 15,16, thus giving rise to the circuit of FIG. 3. On the A.C. side, the circuit has two input terminals K and P, on the D.C. side two output terminals M, N. The terminal K is connected by way of a capacitance $C_{22}$ and inductance $L_{22}$ in series to a first phase 30, which is connected through a diode 32 with the D.C. output terminal M, and through a second diode 46 with the D.C. output terminal N. From A.C. input terminal K, another branch with an inductance $L_{23}$ in it is connected to a second phase 36, which again is connected to the D.C. output terminals M,N through two diodes 38,48. A third phase 40 is directly connected to the second A.C. input terminal P and is likewise connected through two diodes 42,50 with the D.C. output terminals M,N. The diodes 32, 38,42 have their cathodes tied to the D.C. output terminal M and the diodes 46,48,50 have their anodes tied to the D.C. output terminal N. A starting device $A_1$ is connected between the phases 36 and 40 on one side and the two D.C. output terminals M,N on the other.

The circuit shown here corresponds to a three-phase circuit. In the A.C. lead from input terminal P, there flows the negative sum of the two currents $i_2$ and $i_3$ flowing in the branches 22 and 23.

This current is denoted by $-i_1$ where $i_1$ is the current at K. If the reactance values in the branches 22 and 23, i.e. the series connection $C_{22}L_{22}$ and the inductance $L_{23}$, are so chosen for the fundamental frequency of the input A.C. voltage $u_1$ that they are equal but of opposite signs and are of such a magnitude that the apparent power in branch 22 or 23 is 0.65 to 0.85 times the power dissipated in the load $Z_L$, then there are phase-shifts of 120° between the partial currents $i_2$ and $i_3$, $i_3$ and $-i_1$, $-i_1$ and $i_2$, which combine to give a D.C. current $i_4$ of very low ripple. The fine adjustment, in this circuit also, is conveniently effected, with equal reactance values $L_{22}$ and $L_{23}$, by choosing the capacitance $C_{22}$ so that the effective values $I_2$, $I_3$ or D.C. values $|\bar{i_2}|$, $|\bar{i_3}|$ of the partial currents $i_2$, $i_3$ are equal to within ± 20%. One advantage of this circuit is the simpler configuration in that, compared to the circuit of FIG. 1, two inductances, one capacitance and two diodes are eliminated. Of course, this advantage is partly nullified by the fact that the components must be more strongly overdimensioned then in the circuit shown in FIG. 1. A short circuit of the load $Z_L$, e.g. the UV D.C. discharge lamp, leads in consequence of a larger current $i_4$ to a heavier overloading of the reactances so that, for reasons of operating safety, the capacitance $C_{22}$ must be more strongly overdimensioned than $C_{13}$ or $C_{13}'$ in FIG. 1, in case no other protective measures are taken. In addition the current $i_4$ is also voltage dependent.

The power supply of the invention is particularly well-suited to operating a high-current low-pressure ultraviolet-C source in which the radiation is produced in a discharge tube with a thermoemissive cathode and a discharge space, the tube being filled with mercury-/argon and operating with a wall-stabilized D.C. gas discharge at a mercury pressure $p_{Hg}$ between $5 \times 10^{-3}$ and $5 \times 10^{-1}$ Torr. and a discharge-current density between 1 and 25 A/cm², and in which the cathode space connects with the anode space through a pressure-equalization space, the sum of the volumes of the cathode space, anode space and pressure-equalization space being greater than the volume of the discharge space, and the argon pressure $p_{Ar}$ being between 0.01 and 0.5 Torr. A source of such a type is described, for instance, in DT-OS No. 2,412,997 or in the BBC Brown Boveri publication CH-E 5.0115.1 D.

For the operation of such a source, a circuit like that in FIG. 1 was dimensioned as follows:

$L_{12} = L_{12}' = L_{13} = L_{13}' = 125$ mH, $C_{13} = C_{13}'$ 35 μF

With an input voltage of $U_1 = 310$ $V_{eff}$/50Hz, there results $i_1 = 3.2$ $A_{eff}$ and, at the output, the D.C. values: voltage $u_4 = 190$V and current $i_4 = 5.1$ A.

A circuit like that in FIG. 3 was dimensioned as follows:

$L_{22} = L_{23} = 130$mH, $C_{22} = 37$μF

Thus, with $U_1 = 270$ $V_{eff}$/50Hz:

$i_1 = 3.6$ A$_{eff}$ and as D.C. values: U$_4 = 190$V and $i_4 = 5.0$ A.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A.C. voltage fed power supply for D.C. gas-discharge lamps comprising:

full-wave rectifying means connected on the A.C. side to at least two phase-adjusting networks for forming mutually phase-shifted partial currents and connected together on the D.C. side to superimpose the rectified, phase-shifted partial currents, each phase-adjusting network being connected through the full-wave rectifying means to the same load impedance at the two D.C. voltage output terminals, said phase-adjusting networks being purely reactive current paths, the reactance values being such that the effective values or the rectified values of the phase-shifted partial currents flowing therein to the full-wave rectifying means are equal to within ±20%, two Gratz rectifier circuits serving as full-wave rectifying means and wherein the phase-adjusting networks are two reactance branches, each reactance branch being symmetric, reactance-wise, with respect to the associated Gratz rectifier circuit, one of said branches connects to the A.C. terminals of the first Gratz circuit and the other of said branches connects to the A.C. terminals of the second Gratz circuit, and the D.C. terminals of like polarity of the Gratz rectifier circuits are connected together to superimpose the phase-shifted partial currents and are each connected to a D.C. output terminal of the power supply; and, wherein one said reactance branch has an inductance on each side of its associated Gratz rectifier circuit and the other said reactance branch has a series-connected capacitance and inductance on each side of its associated Gratz rectifier circuit and wherein the reactance values of the inductances in the same reactance branch are equal.

2. A.C. voltage fed power supply as in claim 1 wherein the two inductances of the same reactance branch have the same number of turns on the same iron core.

3. A.C. voltage fed power supply as in claim 1 wherein the magnitudes of the reactances of the reactance branches are such that the apparent power is in a reactance branch between 0.5 and 2 times that at the load.

4. A.C. voltage fed power supply as in claim 3 wherein the magnitudes of the reactances of the reactance branches are such that the apparent power in a reactance branch is 0.65 to 0.85 times that at the load.

5. A.C. voltage fed power supply as in claim 1 for operating a high-current low-voltage ultraviolet-C lamp in which the radiation is produced in a discharge tube with a discharge space and mercury/argon filling by a wall-stabilized D.C. gas-discharge at a mercury pressure between $5 \times 10^{-3}$ and $5 \times 10^{-1}$ Torr. and a discharge current density between 1 and 25 A/cm$^2$, and in which the cathode space is connected with the anode space through a pressure equalizing space, where the sum of the volumes of the cathode space, anode space and pressure equaliziing space is greater than the volume of the discharge space and the argon pressure is between 0.01 and 0.5 Torr..

6. A.C. voltage fed power supply for D.C. gas-discharge lamps comprising:

full-wave rectifying means connected on the A.C. side to at least two phase-adjusting networks for forming mutually phase-shifted partial current and connected together on the D.C. side to superimpose the rectified, phase-shifted partial currents, each phase-adjusting network being connected through the full-wave rectifying means to the same load impedance at the two D.C. voltage output terminals, said phase-adjusting networks being purely reactive current paths, the reactance values being such that the effective values or the rectified values of the phase-shifted partial currents flowing therein to the full-wave rectifying means are equal to within ±20%, a three-phase rectifier circuit having six diode elements serving as said full-wave rectifying means and wherein said phase-adjusting networks are two reactance branches with each connected exclusively to only one A.C. voltage phase of said three phase rectifier circuit and wherein one A.C. voltage input terminal of the power supply is connected directly to the third A.C. voltage phase of the rectifier circuit, said one reactance branch containing one inductance only and the other reactance branch having a single inductance connected in series with a single capacitance and wherein these branches are each connected from the same A.C. voltage input terminal of the power supply to one individual phase of said three-phase rectifier circuit.

* * * * *